United States Patent [19]

Suzuki

[11] Patent Number: 4,868,684
[45] Date of Patent: Sep. 19, 1989

[54] IMAGE PROCESSING APPARATUS

[75] Inventor: Yoshiyuki Suzuki, Kawasaki, Japan

[73] Assignee: Canon Kabushiki Kaisha, Tokyo, Japan

[21] Appl. No.: 33,462

[22] Filed: Apr. 2, 1987

[30] Foreign Application Priority Data

Apr. 3, 1986 [JP] Japan .................................. 61-075485
Apr. 3, 1986 [JP] Japan .................................. 61-075486

[51] Int. Cl.$^4$ ............................................... H04N 1/40
[52] U.S. Cl. ..................................... 358/455; 358/456; 358/458
[58] Field of Search .................... 358/280, 282, 283

[56] References Cited

U.S. PATENT DOCUMENTS 4,547,811 10/1985 Ochi et al. ............................ 358/282
4,763,199 8/1988 Suzuki ................................... 358/280
4,782,398 11/1988 Mita ...................................... 358/280

Primary Examiner—Edward L. Coles, Sr.
Attorney, Agent, or Firm—Fitzpatrick, Cella, Harper & Scinto

[57] ABSTRACT

An image processing apparatus is provided by which an image signal is compared with periodic pattern signals to obtain a pulse width modulated image signal. The apparatus comprises picture element generating means for generating picture element signals; discrimination means for discriminating the relation between an attention image picture signal generated from the image signal generating means and the surrounding picture element signals; pattern signal generating means for generating a pattern signal having the waveform a different phase corresponding to the results of discrimination from the discrimination means; and means for generating pulse width-modulated signals based on the picture element signal and pattern signals generated from the pattern signal generating means. The apparatus enables improvement in the reproducibility of fine lines while maintaining the half tone and detection of low-contrast areas thereby improving the image quality.

21 Claims, 14 Drawing Sheets

C < B < A

A < C < B

B < A < C

A < B < C

C < A < B

B < C < A

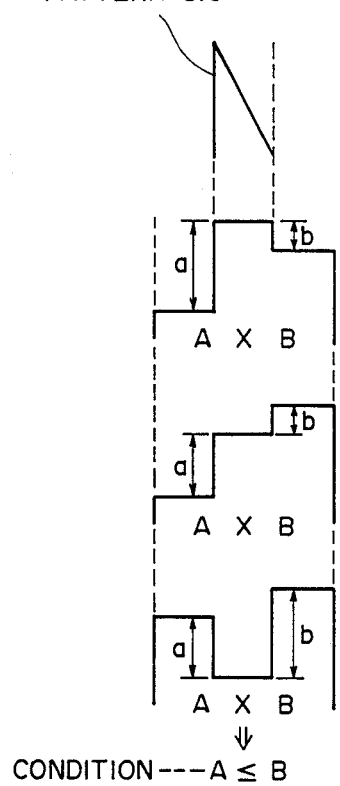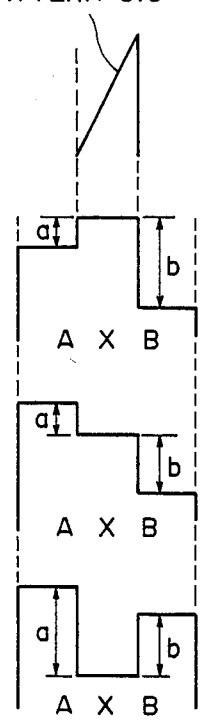
FIG. 14A  FIG. 14B
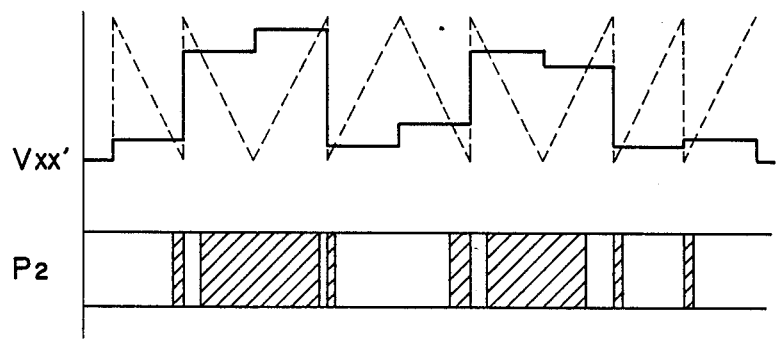
FIG. 15

IMAGE PROCESSING APPARATUS

BACKGROUND OF THE INVENTION

1. Field of the Invention

The present invention relates to an image processing apparatus for processing an image signal.

2. Related Background Art

A procedure has been proposed whereby a pulse width-modulated binary signal is generated by comparison of an analog signal converted from a digital signal with a periodic pattern signal such as a triangle wave for obtaining a half tone gradation (or tonality) when a digital image signal is binary coded to produce an image using a laser beam printer or the like.

FIG. 2 is a specific example of the procedure.

A digital video signal is latched by an image clock video-CLK at a latch 1 to be synchronized. The signal is converted to a analog video signal by a D/A converter 2. The output of the D/A converter, after having been changed to a voltage level at a resistance 3, is applied to one input terminal of a comparator 4. Periodic signals such as a sawtooth wave and a triangle wave are generated from a pattern signal generator circuit 5 and are applied to another input terminal of the comparator 4, in which the signals are compared with the above-mentioned analog video signal and the output of the comparator 4 is a pulse width-modulated video signal. The video signal is applied to a modulation circuit for modulating laser light, which is turned on and off according to the pulse width to produce a half tone image on a recording medium (not shown).

The image clock and the pattern signal are synchronized with a known BD signal which indicates the scanning position of the laser beam. The pattern signal generated from the pattern signal generator circuit 5 is synchronized with the image signal. The repetition period of the pattern signal is usually of an integer multiple of that of the image signal. An optimal period is selected dependent upon the reproduced image, reproducing medium, or reproducing conditions such as a resolution. For instance, when an electronic photograph-typed laser beam printer having a resolution of 400 dots/inch intends to reproduce a sufficient gradation, such as 64 gradations, the period must be about three times that of the picture element. The period of the pattern signal which is made longer than that of the picture element for improving the reproducibility of the half tone is certainly effective for a half tone image but raises a problem of displaying, as shown in FIG. 3, notched-edged characters and broken lines in the image for characters fine lines.

FIGS. 4A and B are drawings for describing the above problem. Vxx' in the figures shows an image signal read out from the portion X-X' in FIG. 3. The signal is compared to a sawtooth wave shown in dotted lines superimposed thereon so as to pulse-width modulate the signal and obtain a reproduced image shown $P_1$. In general, this $P_1$ is preferably reproduced by two black lines. But, fine lines are broken so that a produced character is poor in quality.

FIGS. 4A and B are examples in which sawtooth waves of different periods are employed.

A countermeasure against such a problem raised has been includes an image signal indicating a character with a pattern signal of a short period, such as a sawtooth wave of a period equal to the picture element period thereby reducing conspicuousness of notched characters and broken lines. However such a procedure requires automatic, real-time determination whether the image represents a character or a half-tone. The realization necessitates a complex circuit and may raise a problem of a discrimination error.

SUMMARY OF THE INVENTION

An object of the present invention is to eliminate the above-described disadvantage.

Another object of the present invention is to improve an image processing apparatus.

A further object of the present invention is to provide an image processing apparatus capable of obtaining a reproduced image of high quality.

A still further object of the present invention is to provide an image processing apparatus capable of obtaining a reproduced image of high quality by means of an apparatus of a simple structure.

An another object of the present invention is to provide an image processing apparatus capable of rapidly obtaining a reproduced image of high quality.

An another object of the present invention is to provide an image processing apparatus capable of obtaining a reproduced image of excellent gradation and high resolution.

A further object of the present invention is to provide an image processing apparatus capable of accurately reproducing the original image.

A still another object of the present invention is to improve an image processing apparatus provided with a function capable of detecting the conditions of an image.

Other objects of the present invention will become apparent from the following description and claims based on the accompanying drawings.

BRIEF DESCRIPTION OF THE DRAWINGS

FIGS. 4A and 14B are diagrams showing relationships between adjoining picture elements and the pattern signals used in Embodiment 3.

FIG. 15 is a diagram explaining the procedure of image processing in accordance with Embodiment 3.

DETAILED DESCRIPTION OF THE PREFERRED EMBODIMENT

A preferred embodiment of the present invention will be described in detail with reference to accompanying drawings.

Embodiment 1

FIGS. 5A to 5F give pattern signals (represented by (a) to (f) respectively) in Embodiment 1.

In the embodiment, a sawtooth wave is employed as a base pattern signal of which a period is equal to those 20 picture element periods.

Figure 5A:
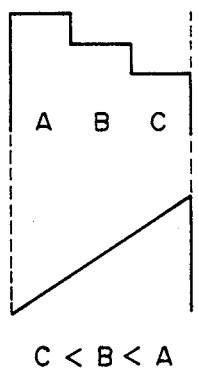
FIGS. 5A to 5F are diagrams showing relationships among picture elements A, B and C and the pattern signals of the respective phases used in Embodiment 1.
Figure 5B:
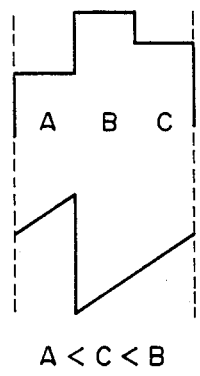

In the FIGS. 5A and 5B, each of A to C represents a picture element (or pixel). A pattern signal is determined on the basis of the relation among levels of the three picture elements A to C. In general, the pattern is determined in such a manner that one of the three pixels to be reproduced in the deepest black is positively blacken, and one pixel to be reproduced in white is positively whiten. (In this embodiment, a pixel of higher level is to represent a deeper density) In other words, a lower level portion of a pattern signal corresponds to a relatively higher level picture element and a higher level portion of the pattern signal to a relatively lower level picture element. In FIGS. 5A to 5F, the upper column shows image signals and the lower column a sawtooth wave-based pattern signals having such a relation.

Figure 5C:
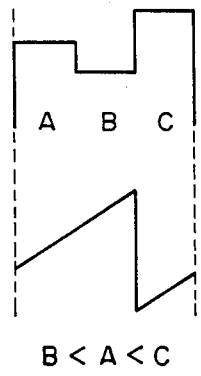
Figure 5D:
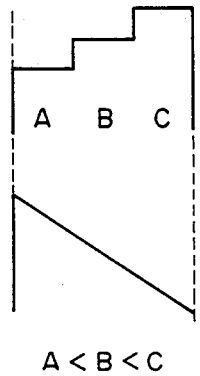
Figure 5E:
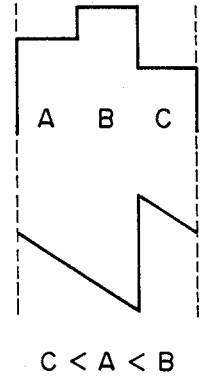

FIG. 5A shows the relationship of the three picture elements A to C, C<B<A, in which, dependent upon the above concept, a portion of the lowest level in the pattern signal corresponds to the element A and a portion of the highest level of the pattern signal corresponds to the element C. Accordingly, the pattern signal is, as shown in FIG. 5A, given in the form of a sawtooth wave of a rising gradient. The reverse case is shown in FIG. 5D, in which the pattern signal is given in the form of a sawtooth wave of a falling gradient. As shown in FIG. 5B, the center B is of the highest level, the right end C is of the second highest level, and the left end A is of the lowest. In this case, the pattern signal is in the form of a sawtooth wave of a rising gradient starting from B. When the level relation between the left and the right is contrary to FIG. 5B, as shown in FIG. 5E, the pattern signal is given by a line of a falling gradient starting from C. FIG. 5C is given by a concave line, in which the center B is of the lowest level, A is of the second lowest, and C is of the highest. Accordingly, the pattern signal is in the form of a sawtooth wave starting from C. When A is of the highest level, the pattern signal forms a sawtooth wave with a falling gradient starting from B. As above-described six types of patterns based on relative relationships of the levels of the three picture elements are prepared. A pattern corresponding to each of the relationships is applied to a comparator as a comparison signal for pulse-width modulation.

Figure 1:
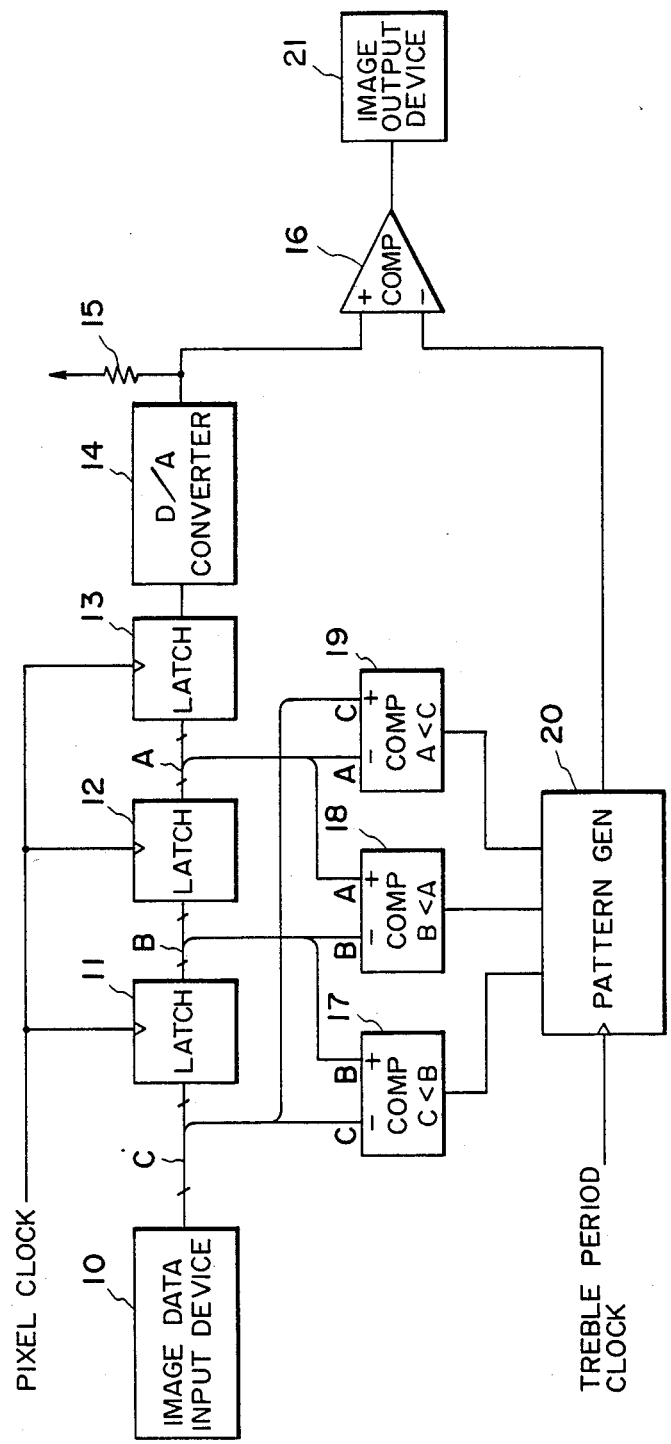
FIG. 1 is a block diagram of an image processing apparatus in accordance with Embodiment 1.

FIG. 1 is a block diagram of an image processing apparatus in accordance with Embodiment 1 for realizing the above. A digital image signal from an image data input device 10 is latched at latches 11, 12 and 13 in synchronism with picture element clocks respectively. Since input data to the respective latches are delayed by each one clock, the respective data correspond to the levels of the three elements C, B, and A as described in FIGS. 5A to 5F. The respective relative levels among the three picture elements can be descriminated by comparing levels of A and B; B and C; and C and A by using the three comparators 17, 18 and 19, the pattern signals according to the relative levels among the three picture elements as shown in FIGS. 5A to 5F can be formed by supplying the output signals from the above comparator to a pattern generator 20 as a switching signal.

As the pattern signal corresponds to the three picture elements, the signals are synchronized by a triple period clock having a period of three times the picture element clock.

Figure 2:
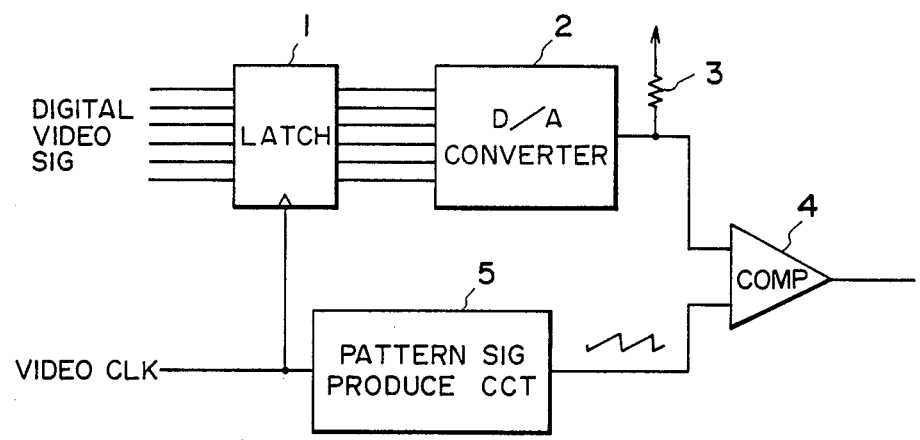
FIG. 2 is a block diagram of an image processing device for obtaining a half tone image.

Alike a conventional apparatus described in FIG. 2, a pulse-width modulated image signal is obtained by comparing, using a comparator 16, an analog image signal converted to a voltage by means of a D/A converter 14 and a resistance 15 with the pattern signal and supplied to an image output device 21.

Figure 6:
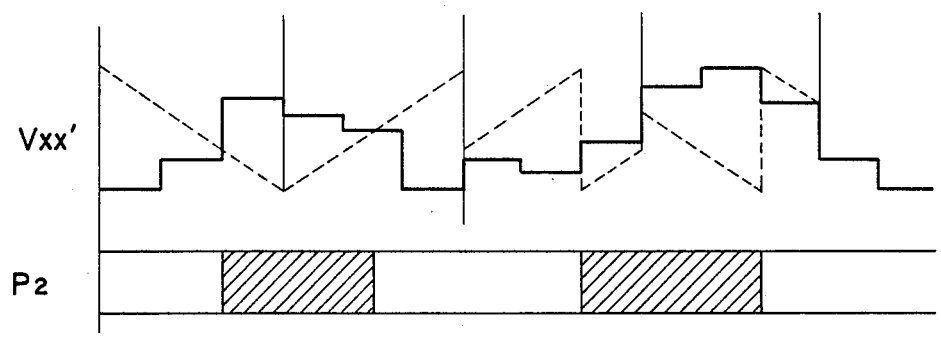
FIG. 6 is a diagram explaining the procedure of image processing in accordance with Embodiment 1.

FIG. 6 shows the result P 2 when an image signal Vxx, as same as inputted in the conventional apparatus, is processed to be pulse width-modulated in this embodiment. As is obvious in the figure, broken lines recognized in P 1 which is formed in the conventional embodiment, are not found in FIG. 6, this fact shows the effectiveness of the present invention.

Figure 7:
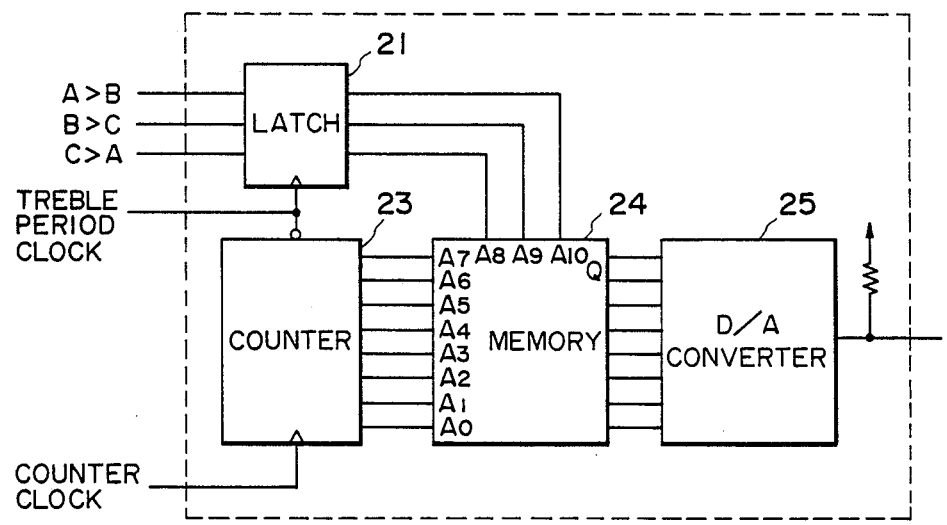
FIG. 7 is a circuit diagram of a pattern generator in accordance with Embodiment 1.

FIG. 7 shows a detailed circuit diagram of the pattern generator 20 in FIG. 1. The outputs A>B, B>C, C>A from the respective comparators 17, 18 and 19 represents the relative levels among the three picture elements relating to one period of the pattern signal, and are synchronized at a latch 21 by means of the triple period clock having a period of three times of the picture elements. The 3-bit output of the latch 21 is applied to a memory 24 as an higher order address to select a pattern signal in the memory 24. Based on the relative levels between two picture elements, the relationship in level among the three picture elements is determined. The pattern signal can be obtained by memorizing a level of the pattern signal on a memory 24 such as an ROM or RAM by in time-series and converting the level to an analog signal using a D/A converter 25. In order to successively change the output data of the memory 24, the output of a counter 23 is applied to the memory 24 as an address input, and the counter 23 is operated by a counter clock. Synchronism of the counter by means of the triple period clock gives the synchronism of the resulting pattern signal.

The resolution power of the resulting pattern signal in the direction of the time axis depends on the period of the counter clock. The higher the speed of the counter clock is as compared with the triple period clock, the higher the resolution power is. As a result, the resolution power in the scanning direction of the pulse width-modulated signal is higher. The resolution power in the direction of the level, namely the gradation (or tonality) depends on the number of the output bits of the memory 24. The more the number of the output bits are, the higher the gradation is. It is necessary to obtain the gradation of the pattern signal equal to that of the image signal.

Because eight bits from $A_0$ to $A_7$ are assigned to one pattern, as shown in FIG. 7, the pattern signal can be provided with resolution power of maximum 256 in the direction of scanning. Because the actual resolution power is given in terms of the ratio of the period of the triple period clock $T_3$ to the period of the counter clock $T_c$, $T_3/T_c$, the latter period can be made 1/256 the former one, or $T_c \geq T_3/256$.

Figures 8, 9:
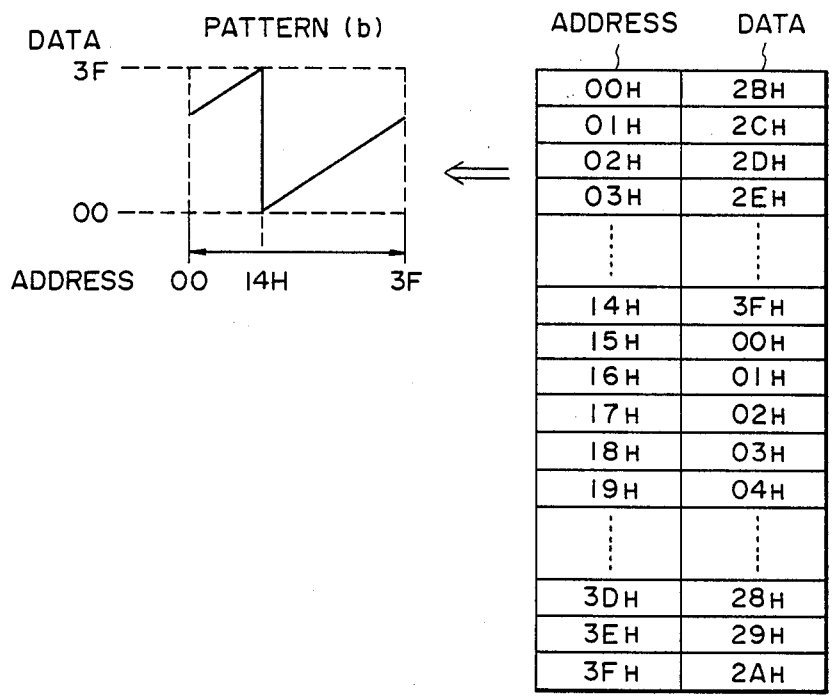
FIG. 8 is a diagram explaining the relationships among the sizes of three picture elements A, B and C, and various pattern signals.
FIG. 9 is a diagram showing an example of memory data from the pattern generator.

FIG. 9 shows a specific example of the pattern in FIG. 5B. The pattern data values are memorized at areas of the respective addresses 00h~3FH of the memory 24, in which E refers to a hexadecimal digit as the address. Accordingly, both the gradation and resolution power in the scanning direction are 64 in this case. In other words, the period of the counter clock is 1/64 that of the triple period clock.

Figure 5F:
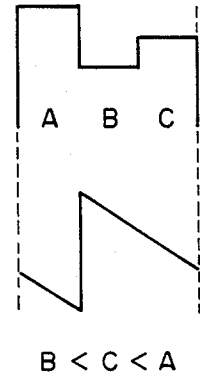
Figure 10:
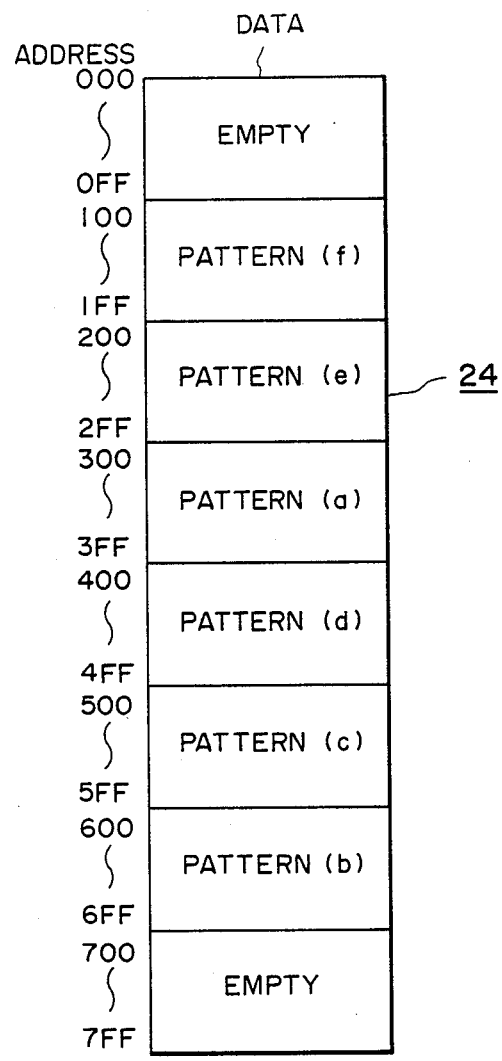
FIG. 10 is a memory map of respective pattern data in accordance with Example 1.

The pattern according to the relative levels among A, B and C can be selected to obtain a desired pattern signal by obtaining such pattern data for the respective patterns (a) to (f) shown in FIGS. 5H to 5F, memorizing the data in the address areas of the memory 24, as shown in FIG. 10, and applying, a 3-bit switching signal representing the relative levels among the three picture elements A, B and C, shown in FIG. 8, to the high order addresses of the memory 24, $A_8$ to $A_{10}$.

Embodiment 2

Figure 11:
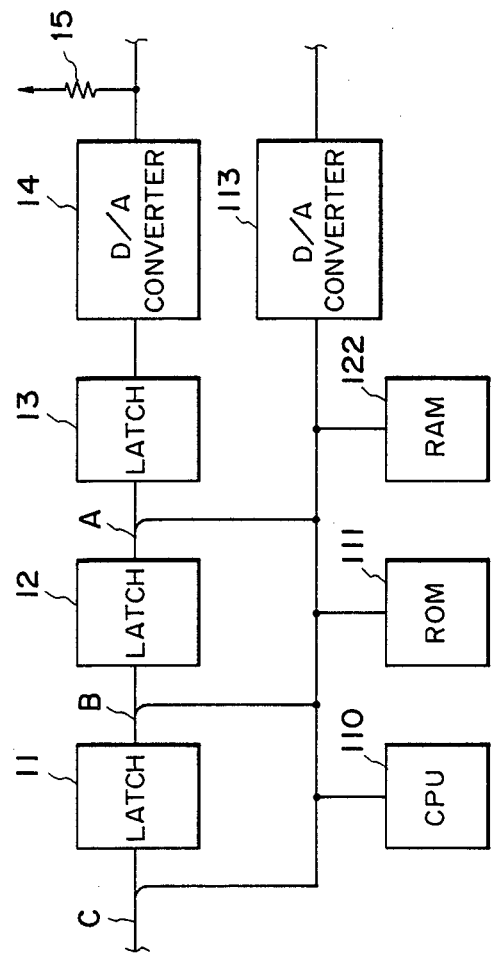
FIG. 11 is a block diagram of an image processing device in accordance with Embodiment 2.
Figure 12:
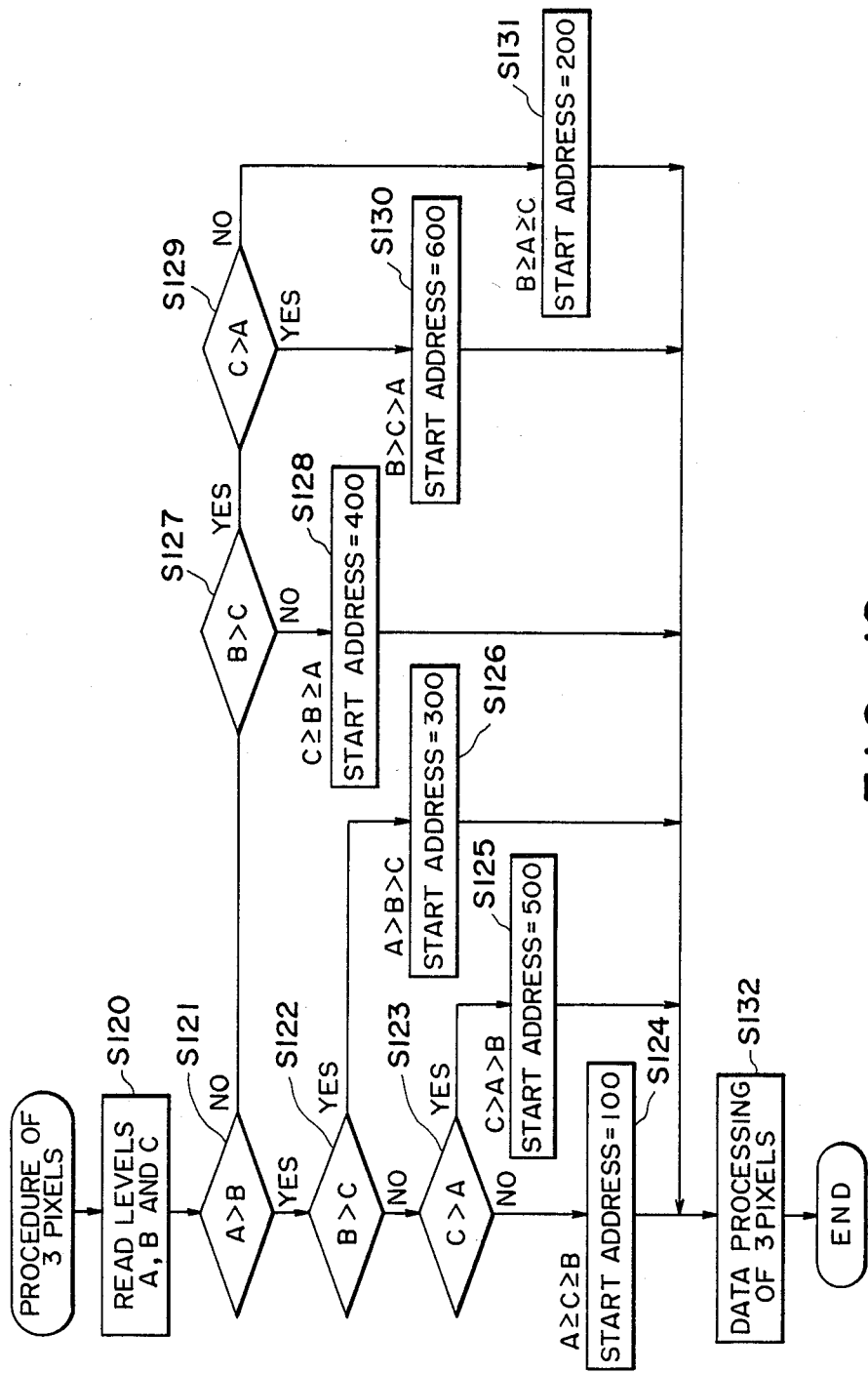
FIG. 12 is a flowchart of a processing program.

FIG. 11 refers to the second embodiment and is a block diagram of a pattern generator in which generation of the pattern is realized by a computer. The comparators 17 to 19 and the pattern generators shown in FIG. 1 correspond to a CPU 110, ROM 111, RAM 112, and a D/A converter 113. An operation of this apparatus is described in accordance with a program flowchart for processing three picture elements, shown in FIG. 12, stored in the ROM 111.

Levels A, B and C on lines near latches 11 and 12 in FIG. 11 are read at a step S120. The relative levels among picture elements A, B and C are compared at steps S121 to 123, 127, and 129. The start address of the output pattern data memorized in the RAM 112 is set in accordance with the results by comparation at steps S124 to 126, 128, 130 and 131. The steps S124 to 126, 128, 130 and 131 are actually shown in the case that the patterns are stored in FIG. 12. The data are in sequence read from the set start addresses, converted into analog signals by the D/A convertor 113 and processed for the three picture elements. The processing for the subsequent three picture elements is repeated from S120.

Although the pattern signal is generated by a digital procedure in this Embodiment, it can be generated by an analog procedure also. The counter may be required for considerably high frequency to obtain especially high resolution when the period of the picture element is shown. Under such a situation, it is more advantageous to selectively switch several generation circuits for generating sawtooth waves of different phases.

Although the pattern signal is switched based only on the relative levels among sizes of the three picture elements in this Embodiment, the reproducibility of fine lines can be improved by detecting the differences among the levels and then providing a delicate variation in the phase to the pattern signal. When the respective differences are smaller than a threshold value, or when the picture has a low contrast, the reproducibility of a half tone can be ensured by generating a basic pattern signal without switching the pattern signal.

In addition, a sawtooth wave has been employed as the basic pattern signal in this Embodiment, but a triangle wave may be employed. In this case, the phase of the triangle wave is switched according to the relative levels of the picture elements.

As described above, in the procedure by which the image signal is compared with a periodic pattern signal thereby obtaining a pulse width-modulated image signal. The reproducibility of images such as characters can be improved, while maintaining the reproducibility of the half tone, by varying the phase of the pattern signal according to the relationship among the image signals within a period of one pattern.

Embodiment 3

Embodiment 3 is described below.

FIGS. 14A and B show the relationship among a picture element X under consideration and the adjoining picture elements A and B, and the corresponding pattern signals. In this embodiment, a sawtooth wave of a rising gradient and that of a falling gradient, the sawtooth waves which are used as the pattern signals, are switched according to the relative levels of adjoining picture elements A and B on both sides of the picture element under consideration as shown in FIGS. 14A and B. As the basic concept of this Embodiment, the picture element levels on both sides of the picture element under consideration are detected, a pattern signal is applied in such that a darker picture element (higher level) is blacken so as to reduce breaks of fine lines as described above. When a sawtooth wave of a falling gradient as shown in FIG. 14A is used as the pattern signal, a pulse width-modulated signal starting from the right side of the picture element is obtained. When a sawtooth wave of a rising gradient as shown in FIG. 14B is used, a pulse-width modulated signal starting from the left side of the picture element is obtained. Accordingly, when the starting point of the pulse withmodulated waveform of the picture under consideration is placed on the higher level side of the picture elements on both sides, a signal across the two picture elements without breaking fine lines can be obtained whereby the above problem is solved.

FIGS. 14A and 14B are based on the concept. When relation of two adjoining picture elements A and B is given by an inequality A<B, as shown in FIG. 14A, the sawtooth of a falling gradient is given as the pattern signal of the attention picture element. On the contrary, when the relation is given by an inequality A>B, as shown in FIG. 14B, the sawtooth of a rising gradient is given as the pattern signal of the picture element under consideration.

Figure 13:
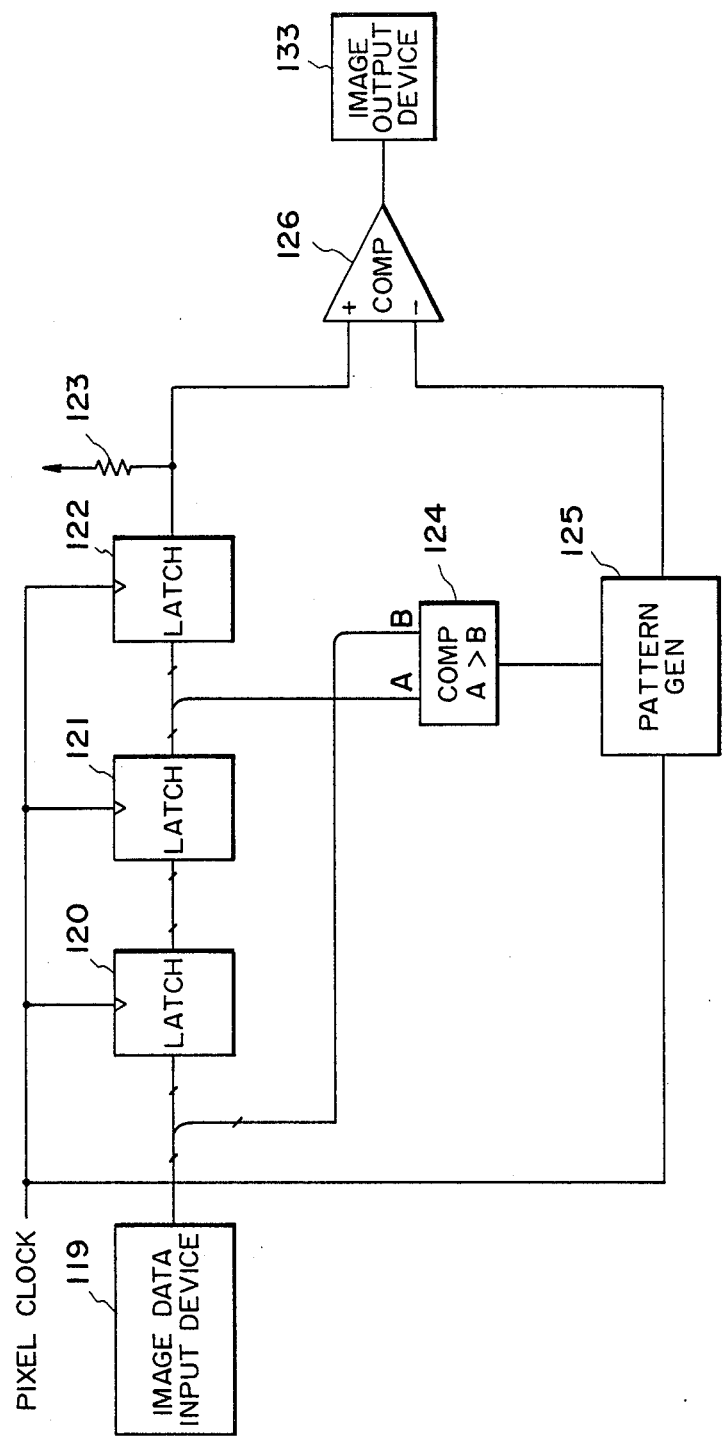
FIG. 13 is a block diagram of an image processing apparatus in accordance with Embodiment 3.

FIG. 13 is a block diagram of an image processing apparatus of Embodiment 3. A digital image signal of multigradation from an image data input device 119 is latched in synchronism with a picture element clock at latches 120 and 121. If the input of the latch 120 corresponds to a picture element b described in FIGS. 14A and 14B, the output corresponds to a picture element X and the output of the latch 121 corresponds to a picture element A. The levels of the picture elements A and B are compared by a comparator 124. The output becomes high when A>B and low when A≦B. The output of the comparator 124 is applied to a signal generator 125 and used as a pattern signal-switching signal. When the signal is high, a sawtooth wave of a rising gradient is produced. When the signal is low, a sawtooth signal of a falling gradient is produced. The pattern signal from the pattern generator 125 is compared with an image signal which is converted into an analog voltage value using a D/A converter 122 and a resistor 123 by a comparator 126 to give a pulse-width modulated image signal, by which an image is applied to an image output device 133.

Figure 3:
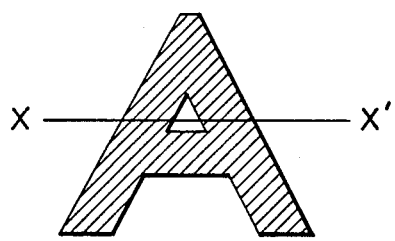
FIG. 3 is a example of the original picture.
Figure 4A:
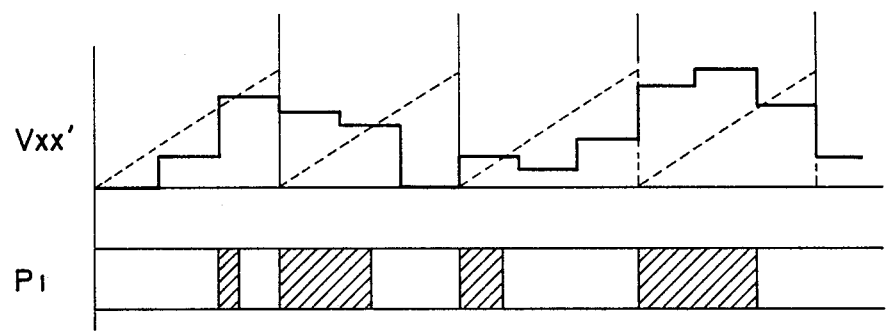
FIGS. 4A and 4B are diagrams explaining the procedure of image processing by means of a circuit given in FIG. 2.
Figure 4B:
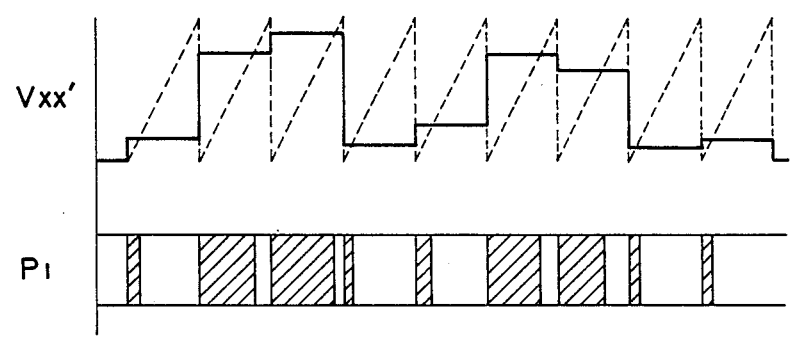

FIG. 15 is a drawing for explaining the effect of the Embodiment. The image signal is obtained by reading the portion of XX' in FIG. 3 as was the case with the description of conventional embodiments. In view of FIG. 15, it is found that the Embodiment is effective as a countermeasure of broken lines as shown in FIG. 4B.

Although the reproducibility of fine lines of characters can be improved by the Embodiment, the pattern signal may rather be irregularly switched at a portion of low constant to give a rough image thereby reproducing an undesirable image. Accordingly, the level difference of the picture element under consideration is detected in addition to the relative levels of the adjoining picture elements. If the difference has a value below a predetermined value, the pattern is judged as of low contrast, so that the pattern signal is not switched.

Figure 16:
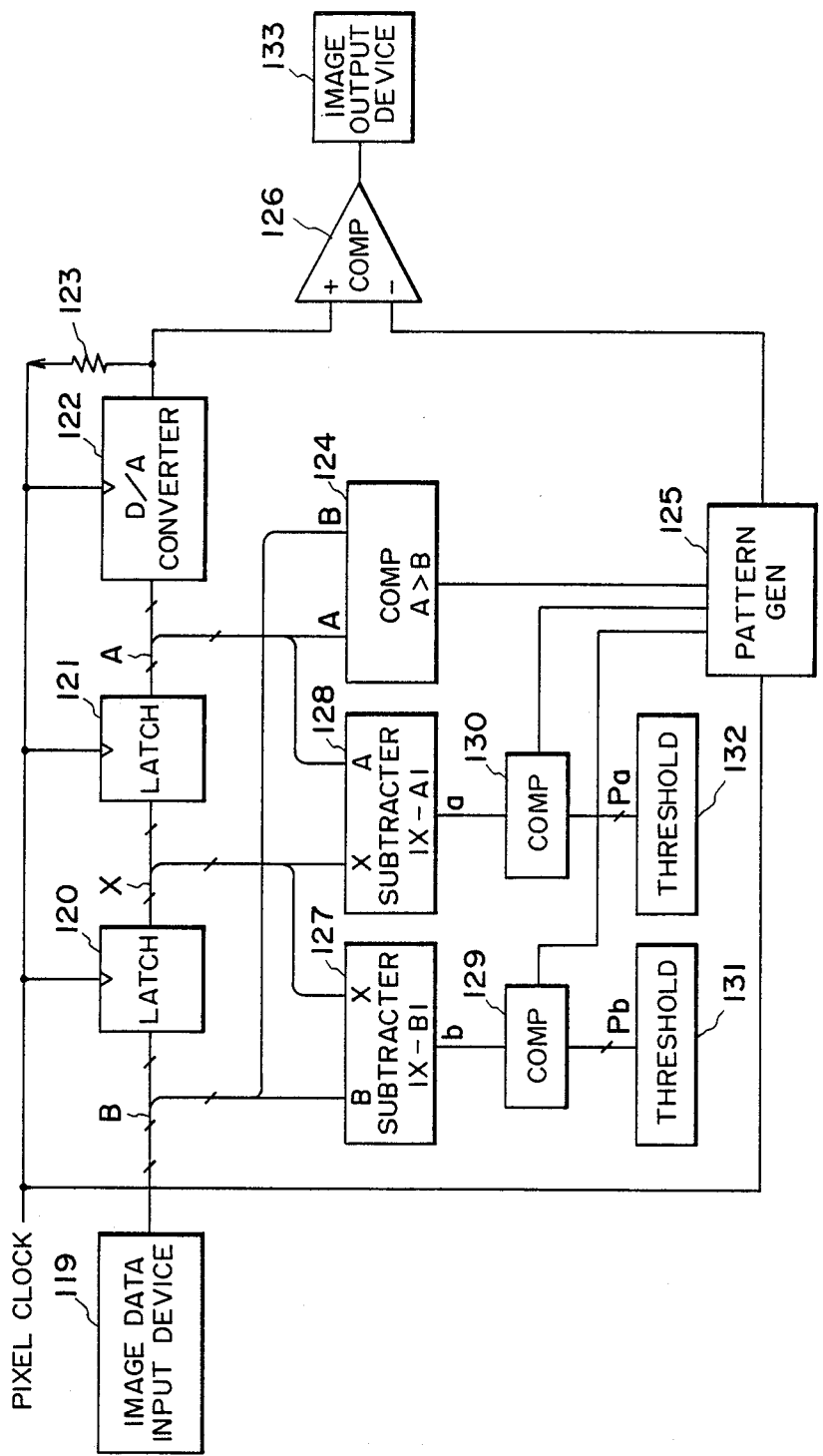
FIG. 16 is a block diagram of a image processing apparatus in accordance with Embodiment 4.

FIG. 16 is an image processing apparatus according to Embodiment 4, in which a function for detecting the level differences between picture element X under consideration and the adjoining picture elements A and B is added to an apparatus shown in FIG. 13. The level difference between the picture element X under consideration and the picture element A is obtained by a subtractor 128. The level difference between the attention picture element X and the picture element B is obtained by a subtractor 127. Although the difference in the signals may be directly applied to a pattern signal generator 125, threshold values $P_a$ and $P_b$ predetermined in threshold value-establishing circuits 132 and 131 are compared with the respective differences in signals a and b by means of comparators 130 and 129 to apply the comparison signals to the pattern signal generator 125. If $P_a > a$ and $P_a > b$, the portion is judged as of low contrast and a pattern signal for low contrast is generated instead of switching the pattern signal as described above.

Figure 17:
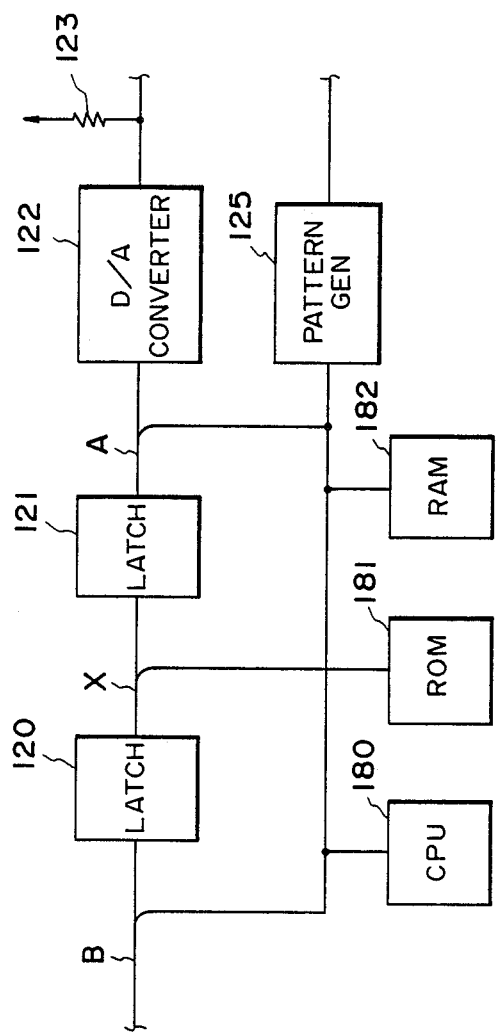
FIG. 17 is a block diagram wherein a circuit in FIG. 16 is realized by a computer.
Figure 18:
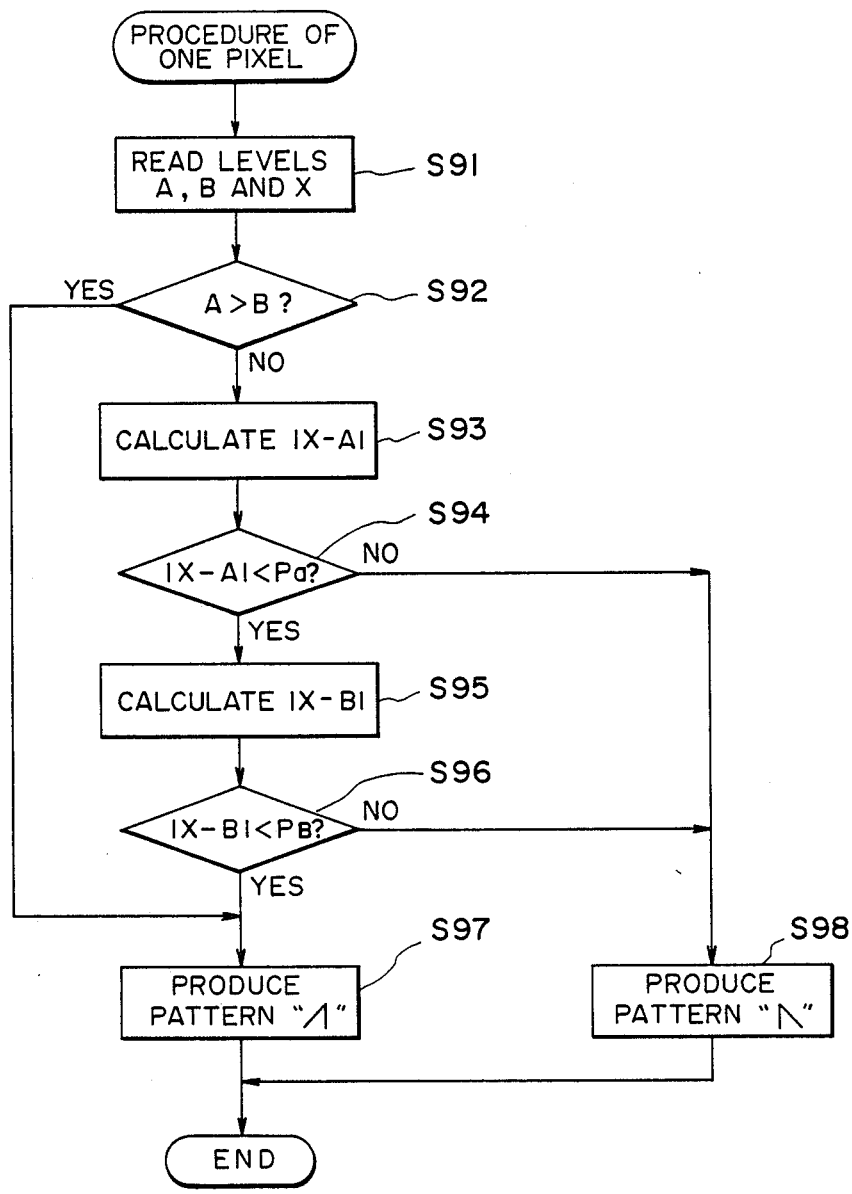
FIG. 18 is a flowchart of an image processing programs.

FIG. 17 is a block diagram showing an example in which the generation of the pattern signal as shown in FIG. 16 is accomplished by a computer. This is composed of a CPU 180, an ROM 181 and an RAM 182. The operation is described with reference to the flowchart of the processing program, shown in FIG. 18, stored in the ROM 181.

The levels of the respective picture elements A, B, and X are read in the RAM 182 at a step S91. Whether or not $A > B$ is checked at S92. If $A > B$, a pattern of a rising gradient is selected at S 97 to process the resulting one-picture element. If $A \leq B$, $|X - A|$ is calculated at S93 and then $X - A < P_a$ is checked at S94. If $|X - A| \leq P_a$, a pattern of a falling gradient is generated at S98 to process one picture element. If $|X - A| < P_a$ at S94, $|X - B|$ is calculated at S95 and then $|X - B| < P_b$ is checked at S96. If $|X - B| \geq P_b$, a pattern of a falling gradient is developed to process one picture element. If $|X - B| < P_b$, one picture element is processed by means of a right-rising pattern. The above processing is performed for all the picture elements.

The pattern may be generated by memorizing the pattern in the RAM 182 and then converting the readout data into an analog signal using a D/A converter.

As described above, the reproducibility of fine lines in characters can be improved, while maintaining the reproducibility of a half tone by detecting the levels of the picture element under consideration and then switching the pattern signal dependent upon the former results. In addition, the quality of the image can be improved by detecting the regions of low contrast and unprocessing such regions.

The invention is not limited to the above-described Embodiments and various modifications may be made within the scope of the following claims.

What is claimed is:

1. An image processing apparatus, comprising:
   pixel signal generating means for generating a pixel signal;
   discriminating means for discriminating a state of the pixel signal generated by said pixel signal generating means; and
   output means for gradation-processing the pixel signal in accordance with a discrimination result provided by said discriminating means, for outputting a pulse-width modulated signal,
   wherein said output means comprises analog pattern signal generating means arranged and constructed to generate plural types of analog pattern signals which have the same period but respective different phases, and
   wherein said output means generates the pulse-width modulated signal in response to at least one of the plural types of analog pattern signals and the pixel signal.

2. An apparatus according to claim 1, wherein one of the plural types of analog pattern signals comprises one period corresponding to that of the pixel signal.

3. An apparatus according to claim 1, wherein said discriminating means discriminates whether a level of a pixel signal under consideration is greater or less than a level of a pixel signal corresponding to pixel adjacent to the pixel under consideration, to generate a discrimination signal.

4. An apparatus according to claim 3, wherein said analog pattern signal generating means generates at least one of the plural types of analog pattern signals in accordance with the discrimination result provided by said discrimination means.

5. An apparatus according to claim 1, wherein the pixel signal comprises a digital pixel signal and said image processing apparatus further comprises a D/A conversion means for converting the digital pixel signal from said pixel signal generating means into an analog pixel signal, and wherein said output means includes comparison means for comparing the analog pixel signal generated by said D/A conversion means with the analog pattern signal.

6. An apparatus according to claim 1, wherein said analog pattern signal generating means includes storing means for storing data and a D/A conversion means for converting the data from said storing means to generate the plural types of analog pattern signals.

7. An apparatus according to claim 1, wherein said discriminating means discriminates the relationship among a pixel signal corresponding to a pixel under consideration and pixel signals corresponding to pixels adjacent to both sides of the pixel under consideration.

8. An image processing apparatus, comprising:
   pixel signal generating means for generating a pixel signal;
   discriminating means for discriminating a state of the pixel signal generated by said pixel signal generating means; and output means for gradation-processing the pixel signal in accordance with a discrimination result by said discriminating means and for outputting a pulse-width modulated signal, wherein said output means comprises analog pattern signal generating means arranged and constructed to generate plural types of analog pattern signals which have the same period but respective different waveforms, and wherein said output means generates the pulse-width modulated signal in response to at least one of the plural types of analog pattern signals and the pixel signal.

9. An apparatus according to claim 8, wherein said discriminating means discriminates a relationship among a level of a pixel signal under consideration and levels of at least two pixel signals adjacent to the pixel signal under consideration to output a discrimination signal.

10. An apparatus according to claim 9, wherein said analog pattern signal generating means generates an analog signal of a sawtoothed wave being different in figure responsive said discrimination signal.

11. An apparatus according to claim 8, wherein one of the plural types of analog pattern signals comprises one period corresponding to the pixel signal.

12. An apparatus according to claim 8, wherein said analog pattern signal generating means generates at least one of the plural types of analog pattern signals in accordance with the discrimination result by said discrimination means.

13. An apparatus according to claim 8, further wherein the pixel signal comprises a digital pixel signal and said image processing apparatus further comprising D/A conversion means for converting the digital pixel signal from said pixel signal generating means into an analog pixel signal, wherein said output means includes comparison means for comparing the analog pixel signal generated from said D/A conversion means with the pattern signal.

14. An apparatus according to claim 8, wherein said analog pattern signal generating means includes storing means for storing data and a D/A conversion means for converting data from said storing means to generate the plural types of analog pattern signals.

15. An image processing apparatus, comprising:
pixel signal generating means for generating a pixel signal; and
pattern signal generating means for generating a pattern signal for gradation-processing the pixel signal,
wherein the pattern signal comprises a period corresponding to the pixel signal, and
wherein said pattern signal generating means generates the pattern signal in such a manner that the pixel signal having a lower level corresponds to a part of the pattern signal having a high level, or in such a manner that the pixel signal having a higher level corresponds to a part of the pattern signal having a low level.

16. An apparatus according to claim 15, further comprising comparing means for comparing the pixel signal with the pattern signal to output a pulse-width modulated signal.

17. An apparatus according to claim 15, further comprising discriminating means for discriminating relationship among levels of the pixel signals and plural adjacent pixel signals and wherein said pattern signal generating means generates a different pattern signal in accordance with a discrimination result provided by said discriminating means.

18. An apparatus according to claim 17, wherein said pattern signal generating means includes storing means for storing data first D/A conversion means for converting the data from said storing means to generate an analog pattern signal and second D/A conversion means for converting a digital signal generated from said pixel signal generating means into an analog pixel signal, and wherein said discriminating means compares the analog pixel signal with the analog pattern signal for outputting the pulse-width modulated signal.

19. An image processing apparatus, comprising:
pixel signal generating means for generating pixel signals, and
pattern signals generating means for generating a pattern signal for gradation-processing the pixel signals,
wherein said pattern signal generating means generates the pattern signal in such a manner that a lower level one of pixel signals on both sides of a pixel signal corresponding to the pattern signal is adjacent to a part of the pattern signal having a high level, or in such a manner that a higher-level one of the pixel signals at both sides of signal corresponding to the pattern signal is adjacent to a part of the pattern signal having a low level.

20. An apparatus according to claim 19, wherein said analog pattern signal generating means includes storing means for storing data and a D/A conversion means for converting data from said storing means to generate the plural types of analog pattern signals.

21. An apparatus according to claim 20, further comprising discriminating means for discriminating relationships between pixel signals at both sides of a pixel signal corresponding to said pattern signal, wherein said pattern signal generating means generates a different pattern signal in accordance with the discrimination result by said discriminating means.

* * * * *

UNITED STATES PATENT AND TRADEMARK OFFICE
CERTIFICATE OF CORRECTION

PATENT NO. : 4,868,684
DATED : September 19, 1989
INVENTOR(S) : YOSHIYUKI SUZUKI Page 1 of 3

It is certified that error appears in the above-identified patent and that said Letters Patent is hereby corrected as shown below:

COLUMN 1

Lines 64-65, "raised has been includes" should read --has been proposed, and includes--.

COLUMN 2

Line 19, "An another" should read --Another--.
    Line 22, "An another" should read --Another--.
    Line 60, "Example 1." should read --Embodiment 1.--.
    Line 66, "FIGS. 4A and 14B" should read --FIGS. 14A and 14B--.

COLUMN 3

Line 28, "blacken," should read --blackened--.
    Line 29, "whiten." should read --whitened.--.
    Line 30, ")" should read --.)--.

COLUMN 4

Line 31, "FIG. 6, this" should read --FIG. 6. This--.
    Line 36, "sents" should read --sent--.
    Line 41, "an" should read --a--.
    Line 47, "by in" should read --by--.

UNITED STATES PATENT AND TRADEMARK OFFICE
CERTIFICATE OF CORRECTION

PATENT NO. : 4,868,684
DATED : September 19, 1989
INVENTOR(S) : YOSHIYUKI SUZUKI It is certified that error appears in the above-identified patent and that said Letters Patent is hereby corrected as shown below:

COLUMN 5

Line 11, "00h-3FH" should read --00H-3FH--.
Line 20, "FIGS. 5H to 5F" should read --FIGS. 5A to 5F--.
Line 22, "applying," should read --applying--.
Line 47, "convertor" should read --converter--.

COLUMN 6

Line 9, "nal. The" should read --nal, the--.
Line 30, "blacken" should read --blackened--.

COLUMN 7

Line 30, "tractor" should read --tracter--.
Line 32, "subtractor" should read --subtracter--.
Line 39, "$P_a>b$" should read --$P_b>b$--.
Line 55, "$X-A<P_a$" should read --$|X-A|<P_a$--.
Line 56, "$|X-A|\leqq P_a$" should read --$|X-A|\geqq P_a$--.

COLUMN 8

Line 6, "unprocessing" should read --not switching--.
Line 36, "corresponding to" should read --corresponding to a--.

UNITED STATES PATENT AND TRADEMARK OFFICE
CERTIFICATE OF CORRECTION

PATENT NO. : 4,868,684
DATED : September 19, 1989
INVENTOR(S) : YOSHIYUKI SUZUKI It is certified that error appears in the above-identified patent and that said Letters Patent is hereby corrected as shown below:

COLUMN 9

Line 22, "sawtoothed" should read --sawtooth--.
    Line 23, "figure responsive" should read --figure responsive to--.

COLUMN 10

Line 12, "ship" should read --ships--.
    Line 19, "data" should read --data,--.
    Line 38, "higher-level" should read --higher level--.
    Line 39, "of signal" should read --of the pixel--.
    Line 48, "claim 20," should read --claim 19,--.

Signed and Sealed this

Seventeenth Day of December, 1991

Attest:

HARRY F. MANBECK, JR.

*Attesting Officer*      *Commissioner of Patents and Trademarks*